US006347450B1

(12) United States Patent
Langlois et al.

(10) Patent No.: US 6,347,450 B1
(45) Date of Patent: Feb. 19, 2002

(54) TOOL FOR MOUNTING COAXIAL CABLE CONNECTORS ON COAXIAL CABLES

(76) Inventors: Pierre Langlois, 18545, Place C. Champagne, Mirabel (Québec) (CA), J7J 1H2; Gilbert Langlois, 12020, 87[ième] Avenue, Rivière-des-Prairies (Québec) (CA), H1C 1J4

( * ) Notice: Subject to any disclaimer, the term of this patent is extended or adjusted under 35 U.S.C. 154(b) by 0 days.

(21) Appl. No.: 09/507,731

(22) Filed: Feb. 22, 2000

Related U.S. Application Data

(63) Continuation-in-part of application No. 09/122,691, filed on Jul. 27, 1998, now abandoned.
(60) Provisional application No. 60/145,063, filed on Jul. 16, 1999.

(51) Int. Cl.[7] .......................... B23P 19/00; H01R 43/00

(52) U.S. Cl. ............................. 29/748; 29/747; 29/750; 29/857; 81/121.1; 81/53.2; 81/124.7; 81/177.5; 81/459; 81/7; 81/142

(58) Field of Search .......................... 29/748, 747, 750, 29/754, 857, 863; 439/585; 81/459, 53.2, 121.1, 124.7, 177.5, 15.7; 7/138, 142

(56) References Cited

U.S. PATENT DOCUMENTS

| | | | | |
|---|---|---|---|---|
| 4,244,067 A | | 1/1981 | Rowe | |
| 4,763,546 A | * | 8/1988 | Yeh et al. | 81/15.7 |
| 5,501,616 A | | 3/1996 | Holliday | |

* cited by examiner

*Primary Examiner*—Lee Young
*Assistant Examiner*—Rick Kiltae Chang
(74) *Attorney, Agent, or Firm*—Francois Martineau

(57) ABSTRACT

The tool is for facilitating installation of a conventional cable connector to the end section of a conventional coaxial cable. The tool has a permanently T-shaped handle defining a handle grasping segment and a handle spacing segment integrally attached to the handle grasping segment at a right angle thereto. A tool fastening sleeve is attached to the handle spacing segment. The tool fastening sleeve has an external thread adapted to engage to the internal thread of the fastening sleeve which is part of the conventional cable connector. The tool fastening sleeve also has a tool fastening sleeve channel for receiving a segment of the inner conductor extending through the conductor fastening sleeve and protruding from the proximal edge of the connector fastening sleeve. The tool is adapted to be releasably secured to the conventional cable connector and used to ergonomically push the latter within the end section of the cable. Once the cable connector is secured to the cable, the tool is threadingly disengaged from the connector.

7 Claims, 2 Drawing Sheets

Fig. 1
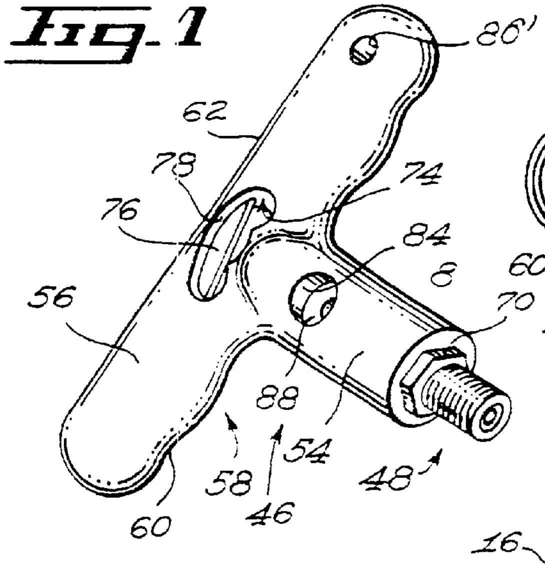
Fig. 2
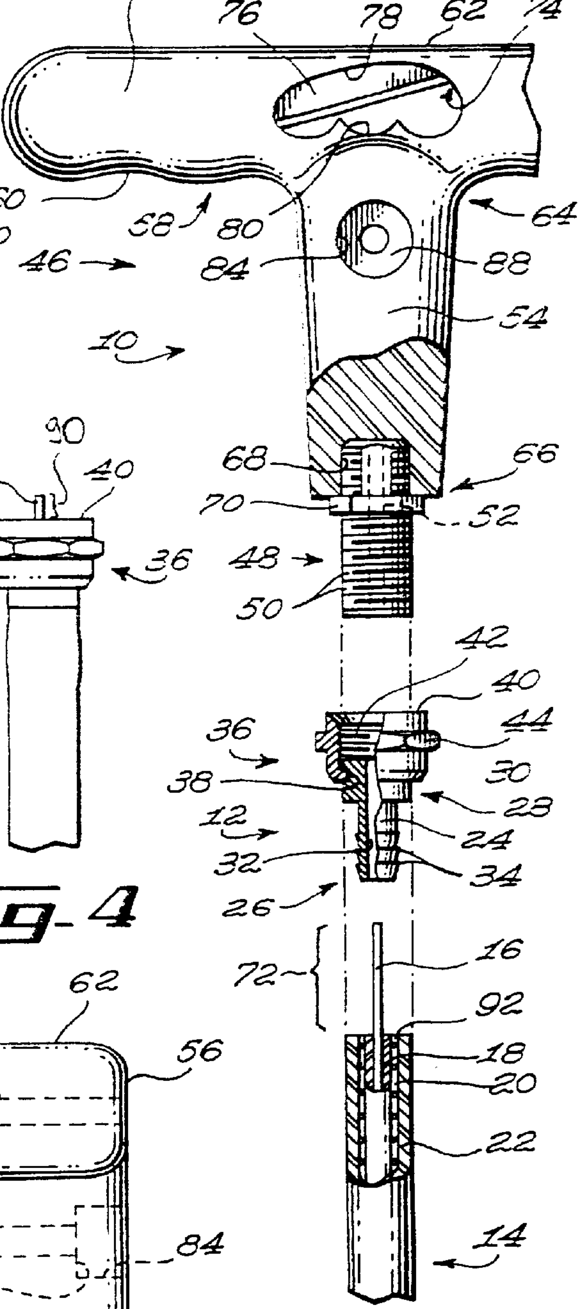
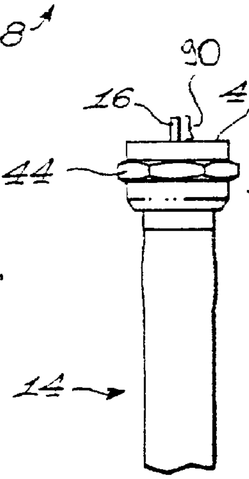
Fig. 4
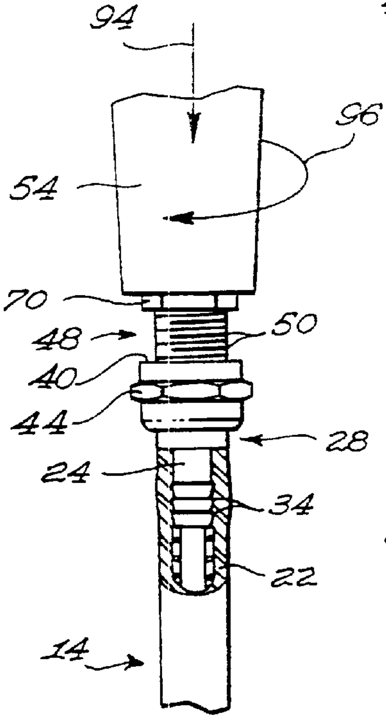
Fig. 3
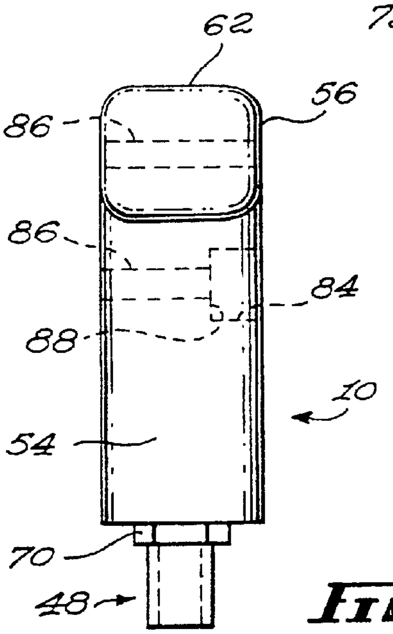
Fig. 5

TOOL FOR MOUNTING COAXIAL CABLE CONNECTORS ON COAXIAL CABLES

CROSS-REFERENCE DATA

The present application is a Continuation-In-Part application of U.S. patent application Ser. No. 09/122,691 filed on Jul. 27, 1998—now abandoned—in the name of the present applicants Pierre LANGLOIS and Gilbert LANGLOIS.

The present application further claims the priority of co-pending Provisional Patent Application No. 60/145,063 filed on Jul. 16, 1999 by the present applicants Pierre LANGLOIS and Gilbert LANGLOIS (hereafter the Provisional Application), and incorporates the subject matter of this Provisional Application to the present application by way of reference.

FIELD OF THE INVENTION

The present invention relates a tool for installing coaxial cable connectors on conventional coaxial cables.

BACKGROUND OF THE INVENTION

Coaxial cables are used extensively for carrying signals to a variety of common devices such as televisions, VCRs, cable converters, radio systems and the like. Typical coaxial cables include a centrally located inner electrical conductor surrounded by an outer electrical conductor that is inwardly spaced relative to the inner conductor. A dielectric insulator is positioned between the inner and outer conductors. The outer conductor is protectively surrounded by a dielectric jacket. Conventionally, the inner conductor is made of a conductive wire while the outer conductor forms a sleeve made of a sheet of fine braided metallic strands, a metallic foil or multiple layer combinations of either or both.

Coaxial cables are typically provided with coaxial cable connectors mounted at each longitudinal end thereof. The connectors are adapted to be threaded into a complimentary interface port so as to electrically connect the coaxial cables to the various electronic devices. Most conventional coaxial cable connectors have a generally tubular configuration defining a connector front end carrying an appropriate fastener designed to mate with the equipment ports or terminals. The conventional cable connectors typically also define a rear end having either a single inner sleeve or inner and outer radially spaced open-ended concentric sleeves. When two concentric sleeves are used, the inner sleeve is configured so as to be insertable into the specific section of the coaxial cable in electrical contact with the outer conductor and electrically insulated from the inner conductor by means of a dielectric insulator. The outer sleeve is gripped to securely couple the connector to the cable and to achieve an electrical ground connection and weather seal.

Although conventional coaxial cables and conventional coaxial cable connectors adequately perform their respective functions, they collectively suffer from at least one major drawback. Indeed, although well designed for their individual intended purpose, they are rather difficult to assemble.

Mounting a conventional cable connector to a conventional coaxial cable involves a set of steps which require a good amount of force to be manually applied, without compromising the precision of the operation. In order to insert a coaxial cable connector with onto the free end portion of a coaxial cable, an individual must first strip away a predetermined length of outer conductor and dielectric insulators to leave only a predetermined length of inner conductor protruding from the end section of the coaxial cable. The individual must then secure with on hand the end section of the coaxial cable and use the other hand to force the inner sleeve of the connector into the cable end with the sleeve operatively engaging the outer conductor. When an outer sleeve is used, a crimp tool is used to crimp the outer sleeve on the outer surface of the protective jacket. This operation not only requires manual dexterity but is also tedious and time consuming. Furthermore, the relatively small cable connector is difficult and awkward to manipulate thus potentially leading to improper engagement of the connector with the conductive components of the coaxial cable. Furthermore, the relatively sharp edges of the connector and/or pointed tip of the conductors may puncture the skin of the installer thus potentially causing injury.

Grasping of both the connector and the cable reduces the accuracy of the mounting operation, which requires a certain degree of precision for providing optimal contact between the connector and the coaxial cable. Furthermore, small angular deviations of the connector axis relative to the coaxial cable axis may render the connection inoperative. Also, the length of the stripped portion of the inner conductor must be gauged accurately so that a predetermined length of inner conductor protrudes from the connector once the latter is mounted on the cable.

It is important to note that properly mounting a cable connector to the free end portion of a coaxial cable, is not a simple task: it requires a good deal of manual dexterity, to combine proper precision for ensuring a suitable connection between the connector and coaxial cable, with applying a sufficient force required to insert the cable connector stem between the alternating insulating and conductive layers of the coaxial cable free end portion against the friction of the resilient insulating material on the connector stem.

U.S. Pat. No. 4,244,067 issued in 1981 to R. D. Rowe, shows a tool in the form of a pair of pliers, including two arms or handles which are each provided with a coextensive cutting element. The two cutting elements together form a jaw, with cutting edges inwardly oriented in the jaw, for cutting or stripping a cable. The lower end of one of the handles of the Rowe pliers is provided with a threaded free end portion which further includes a central channel. This threaded free end portion is destined to be threadingly engaged by a cable connector, for temporarily fixing the cable connector to the cable.

FIG. 6 of the annexed drawings shows the Rowe pliers 100 in an opened condition, i.e. with the two arms 102, 104 being spread in their opened limit position. A cable connector is destined to be temporarily fixedly installed on the lower threaded end portion 106 of arm 102. Arms 102, 104 are pivoted at 108 to allow jaw 109 to be selectively opened, thus separating the cutting elements 110, 112 and their respective cutting edges 114, 116.

Arrow A1 in the annexed FIG. 6 shows the intended direction of the pressure to be applied on a cable connector to operatively install same on the outer free end portion of a coaxial cable. This direction is aligned with the general longitudinal axis of the first arm or handle 102. By manually grasping either one of the two handles 102, 104 or both handles 102, 104 simultaneously, a person can insert the cable connector onto the outer free end portion of the coaxial cable, without directly manually holding the small cable connector. For example if only first handle 102 is grasped as shown by the position of the hand H in FIG. 6, one can squeeze the handle with his fingers, and then axially push the cable connector onto the cable free end portion. If both handles 102, 104 are grasped, handles 102, 104 are then in a closed position (as shown for example in FIG. 3 of the Rowe patent), and the hand position is similar to that of hand H in FIG. 6 of the annexed drawings, although the hand will be more opened to fit around the spaced-apart pair of handles 102, 104.

In any event, the pressure applied by the hand must be applied according to the direction of arrow A2, i.e. aligned with the intended direction in which the connector is to be pushed. This is likely to result in the hand sliding along the handle 102 if only handle 102 is held, or around handles 102, 104 if both handles are held. Indeed, only the friction resulting from the hand being forcefully closed onto handle 102 or handles 102, 104 will prevent the sliding of pliers 100 in the hand. Furthermore, if only handle 102 is grasped, it will become difficult to apply sufficient pressure thereon to frictionally prevent the handle 102 from sliding, considering the small diameter of handle 102. If both handles 102, 104 are grasped, then in addition to the above-mentioned problem, it will also become difficult to prevent a slight angular deviation of the cable connector relative to the coaxial cable to occur while it is being installed, due to the fact that the tool will not be symmetrically aligned relative to the connector and cable free end portion, and consequently the tool is likely to pivot about threaded end 106 when downward pressure is applied while both handles 102, 104 are being held.

To attempt preventing the hand from sliding on pliers 100 when the connector is being installed, one could try holding the transverse second handle 104 while pliers 100 are in an opened condition, as shown by the alternate position H' of the hand in the annexed FIG. 6. Arrow A3 shows that the hand still forces the pliers along the direction of threaded end portion 106, to properly install the cable connector, while the transversely positioned handle 104 is not aligned with first handle 102, thus effectively reducing the likelihood of the hand sliding therealong. However, as shown in FIG. 6, this will result in handle 104 pivoting about pivot 108 towards its closed position, thus effectively preventing installation of the cable connector by holding the pliers in this way. To circumvent this, the fingers could be positioned between handles 102, 104 close to pivot 108 as shown with hand H', but the person's fingers would then be squeezed between the arms 102, 104 under the pivoting movement second handle 104 towards its closed position.

It is understood that it is impossible for a person to hold the handle 104 on either side of pivot 108 to apply, pressure in the direction of handle 102 with his palm, since the person's palm would then be applied against the pointed tip 118 of cutting element 112, and also against the upper free cutting edge 116 of cutting element 110, thus effectively cutting into the person's hand. Furthermore, should the jaw 109 close itself while the person's fingers or hand is located between edges 114, 116, important wounds are likely to occur. Consequently, this alternate way of grasping pliers 100 is not a viable option.

If only one of the two handles 102, 104 is grasped for inserting the cable connector onto the cable free end portion, the other free handle is likely to become cumbersome and annoying, since it will be allowed to freely pivot at all times, when the pliers are handled.

Thus, although the Rowe patent does show a tool for installing a cable connector on a coaxial cable, the Rowe tool is not believed to be an efficient tool for installing cable connectors on coaxial cables. It is understood that Rowe does provide a pair of multifunctional pliers that can be used for accomplishing a number of different tasks related coaxial cables, but that these multiple functions of the Rowe pliers are a detriment to the efficiency of the particular coaxial cable connector installation function.

OBJECTS OF THE INVENTION

It is an object of the present invention to provide a tool facilitating the mounting of coaxial cable connectors on conventional coaxial cables.

It is a further object of the present invention that the tool allows for easy and ergonomic mounting of a conventional coaxial cable connector on the end section of a conventional coaxial cable.

It is a further object of the present invention that the tool reduces the risk of damaging both the connector and the cable, and increases the accuracy of the connection and thus improves the electrical properties of the assembled cable-connector combination.

It is yet another object of the present invention that the tool reduces the amount of time required for mounting the connector to the cable and the amount of manual dexterity required for performing the operation.

It is another object of the present invention that the tool reduces the risk of injury related to the assembly operation and ensures relatively constant achievement of a proper contact that will withstand frequent use and connect-disconnect cycles.

It is an important object of the present invention that the tool allows one to forcibly install the cable connector in the coaxial cable by applying direct pressure on the tool with the flat palm portion of his hand, to prevent the tool from sliding in the person's hand and to allow for a greater force to be exerted by the person.

SUMMARY OF THE INVENTION

The present invention relates to a tool for mounting a cable connector of the type having a hollow connector stem defining an inner channel and a connector fastening sleeve carried by and coextensive with the connector stem, to the free distal end portion of a coaxial cable of the type having an outer open-ended sleeve member and an inner conductor inside the cable sleeve member, with the inner conductor having a protruding portion axially protruding out of the cable outer sleeve member, said tool comprising:

an integral, rigid T-shaped handle defining a straight elongated grasping segment and a second straight elongated spacing segment originating and integrally extending perpendicularly from an intermediate portion of said grasping segment and having a free extremity opposite said grasping segment, wherein the perpendicular orientation of said grasping segment relative to said spacing segment of said handle is permanent;

a tool fastening sleeve fixedly and coextensively attached to said spacing segment free extremity, said tool fastening sleeve having an outer surface sized and configured for complementary engagement with the connector fastening sleeve, said tool fastening sleeve further having an inner channel sized for sliding engagement therein of the protruding portion of the cable inner conductor;

an attachment member provided on said tool, for releasably fixedly attaching said connector fastening sleeve to said tool fastening sleeve;

wherein the cable connector can be removably attached to said tool fastening sleeve by engaging the connector sleeve onto said tool fastening sleeve with said attachment member operatively inter-connecting said tool and the connector.

Preferably, said attachment member on said tool fastening sleeve is a thread, for threadingly engaging a complementarily thread on the connector fastening sleeve.

Preferably, said handle is provided with a stripping blade for stripping a section of the cable sleeve member away from said inner conductor for creating the inner conductor protruding portion, said stripping blade being mounted on said handle.

Preferably, said handle is provided with an aperture in which said stripping blade is mounted so as to extend partially across said aperture.

Preferably, said stripping aperture defines a stripping aperture blade mounting edge and an opposed stripping aperture cable abutment edge, said blade extending from said blade mounting edge in an inclined fashion relative to said cable abutment edge.

Preferably, said cable abutment edge is provided with grooves formed thereon.

Preferably, said handle includes a gauging aperture extending therethrough, said gauging aperture having a complete cable receiving section configured and sized for receiving the cable outer sleeve member and an inner conductor receiving section configured and sized for receiving the inner conductor protruding portion, said complete cable receiving section and said inner conductor receiving section defining an abutment shoulder for the axial abutment thereon of the sleeve member of the cable free end portion thus allowing gauging of the length of the protruding portion of the inner conductor.

Preferably, said grasping segment defines a generally rectilinear palm contacting section and an opposed wavy finger contacting section formed with grooves sized and shaped to receive the hand's fingers therein.

Preferably, said tool further comprises a hooking aperture extending transversally through said grasping segment.

BRIEF DESCRIPTION OF THE DRAWINGS

In the annexed drawings:

FIG. 1 is a perspective view of a tool in accordance with the present invention for installing coaxial cable connectors on coaxial cables;

FIG. 2 is a slightly enlarged partial front elevation, partly in crosssection, of the end section of a conventional coaxial cable, a conventional cable connector and part of the tool shown in FIG. 1;

FIG. 3 is an enlarged partial elevation, partly in cross-section, of the lower end of the tool shown in FIG. 1 being used for mounting a cable connector to the end section of a coaxial cable;

FIG. 4 is an elevation of the free end portion of a cable operatively fitted with a cable connector;

FIG. 5 is a transverse elevation of the tool of FIG. 1, showing in dotted lines some of the internal elements of the tool;

DETAILED DESCRIPTION OF THE INVENTION

Figure 6:
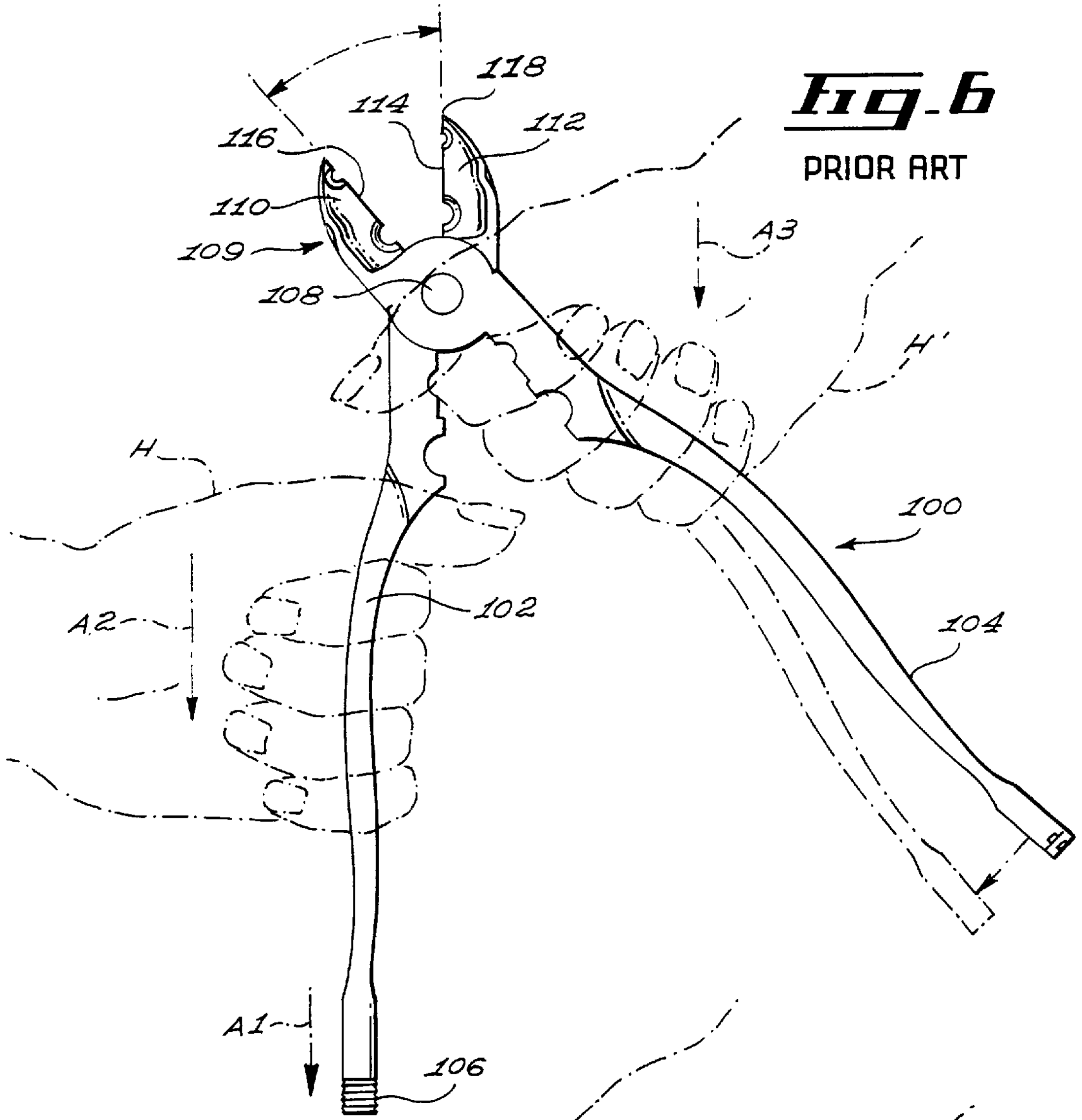
Fig. 6 PRIOR ART
FIG. 6 is a front elevation of a prior art pair of pliers used for stripping coaxial cables and installing cable connectors on the outer free end portions of coaxial cables, showing in phantom lines two hands holding the pliers at alternate positions and further suggesting the relative pivotal relationship of the two arms of the pliers.

Referring to FIG. 2, there is shown a tool 10 in accordance with the present invention, a conventional cable connector 12 and an end section part of a conventional coaxial cable 14.

In the example herein selected for illustrative purposes, the cable 14 includes an inner conductor 16 surrounded by and spaced inwardly from an outer conductor 18. Typically, the inner conductor 16 takes the form of an electrically conductive wire while the outer conductor 18 takes the form of a cylindrical sleeve made of a sheet of fine braided metallic strands, metallic foil or multiple layer combinations of either or both.

The inner and outer conductors 16 and 18 are electrically insulated from each other by an inner insulating sleeve 20 interposed therebetween. The inner insulating sleeve 20 is made out of a conventional dielectric insulating material. The outer conductor 18 is protectively surrounded by an outer insulating sleeve 22 typically made out of an elastomeric material.

In the example herein selected for illustrative purposes, the cable connector 12 has a generally elongated connector stem 24 defining a stem distal end 26 and a longitudinally opposed stem proximal end 28. A stem flange 30 extends from the stem 24 adjacent the stem proximal end 28. The stem 24 has a stem channel 32 extending longitudinally therethrough. The stem channel 32 is preferably configured and sized for fittingly receiving the inner conductor 16. The stem 24 is preferably provided with serrations 34 formed on its outer surface adjacent the stem distal end 26 for frictionally engaging inner components part of the coaxial cable 14.

A connector fastening sleeve 36 is rotatably mounted on the stem flange 30. Typically, the stem flange 30 defines a sleeve retaining groove 38 for receiving an inwardly bent distal segment of the connector fastening sleeve 36. The inwardly bent segment is arranged to co-operate in operative inter-engagement with the groove 38. The connector fastening sleeve defines a connector sleeve proximal peripheral edge 40. The connector fastening sleeve has an internal thread 42. Preferably the connector fastening sleeve is further provided with a radially outwardly extending segmented protuberance 44 for facilitating grasping with conventional tools such as pliers or the like.

Other conventional connector construction (not shown) typically include an outer radially spaced concentric sleeve provided with internal serrations for mounting over the outer insulating sleeve 22 of the cable 14.

It should be understood that both the cable connector 12 and the coaxial cable 14 are only shown as examples of cables and connectors that can be assembled together using the tool 10 in accordance with the present invention and that other cable and connector configurations could be used without departing from the scope of the present invention.

The tool 10 includes a handle 46 and a tool fastening sleeve 48 attached to the handle 46. The tool fastening sleeve 48 has a tool fastening sleeve external thread 50 formed thereon. The tool fastening sleeve is configured and sized so that its external thread 50 may threadably engage the internal sleeve thread 42 of the cable connector 12. The tool fastening sleeve 48 also has a tool fastening sleeve channel 52 for receiving a segment of the inner conductor 16 extending through the connector sleeve 36 and protruding from the connector sleeve proximal peripheral edge 40.

The handle 46 has an integral, rigid, T-shaped configuration defining a spacing segment 54 aligned with the tool fastening sleeve channel 52 and a perpendicular grasping segment 56 from which originates spacing segment 54 and which integrally carries spacing segment 54. The grasping segment 56 preferably defines a wavy section 58 thereunder provided with grooves 60 configured and sized for receiving the fingers of an intended user so as to facilitate grasping of the grasping segment 56. The section 58 is thus adapted to act as a finger engaging section while an opposed rectilinear section 62 is adapted to act as a palm contacting section 62 when the grasping section 56 is grasped by the hand of an intended user.

The spacing segment 54 defines a spacing segment proximal end 64 and a longitudinally opposed spacing segment distal end 66. The tool fastening sleeve 48 is attached to the spacing segment distal end 66. A sleeve receiving recess 68 is formed in the spacing segment distal end 66. The sleeve receiving recess 68 is provided with an internal thread configured and sized for receiving a proximal segment of the tool fastening sleeve 48. A conventional washer type component 70 is used for limiting insertion of the proximal segment of the tool fastening sleeve 48 within the sleeve receiving recess 68.

The tool 10 is provided with a stripping means mounted thereon for stripping away a section of the outer conductor 18, the inner insulating sleeve 20 and the outer insulating sleeve 22 so as to define an inner conductor unassembled protruding segment 72. Typically, the stripping means includes a stripping aperture 74 formed in the handle 46 and preferably in the grasping section 56 thereof. At least one stripping blade 76 is mounted so as to extend at least partially through the stripping aperture 74. Preferably, the stripping aperture 74 has a blade mounting edge 78 and an opposed cable abutment edge section 80. Cable abutment edge section 80 is provided with grooves formed thereon.

Tool 10 further includes a gauging means for gauging the length of the inner conductor unassembled protruding segment 72. The gauging means includes a gauging aperture extending through the handle 46 typically through the spacing segment 54 thereof. As illustrated more specifically in FIG. 5, the gauging aperture defines a complete cable receiving section configured and sized for receiving a distal section of the cable 14 with its inner and outer conductor 16, 18 and both its inner and outer insulating sleeves 20, 22. The gauging aperture also defines an inner conductor receiving section configured and sized for receiving the inner conductor unassembled protruding section 72. The complete cable receiving section 84 and the inner conductor receiving section 86 part of the gauging aperture 82 define an abutment shoulder 88.

The tool 10 preferably further includes a hooking aperture 86 extending through the handle 46 preferably adjacent a longitudinal end of the grasping section 46. A hooking aperture 86 is configured and sized for receiving a conventional hooking component extending from a supporting wall (not shown).

In use, in order to mount the connector 12 to an end section of the cable 14, a distal segment of the outer conductor 18 and both the inner and the outer insulating sleeves 20, 22 are first stripped away from a distal segment of the inner connector 16 so as to form the inner connector unassembled protruding segment 72. In order to perform the stripping operation, the user of tool 10 needs to insert a predetermined length of the cable 14 in the stripping aperture 74 until it abuts against the cable abutment segment 80 and the blade 76 so as to strip the proper segment using a pulling and rotating movement as is well known in the art. The angled configuration of the blade 76 and the serrations formed in the cable abutment section 80 allow to strip cables having various diameters.

The length of the inner conductor unassembled protruding segment 72 must be substantially accurately obtained according to predetermined requirements so that the inner conductor assembled protruding segment 88 presents a suitable length. The length of segment 88 must be maintained within a predetermined range in order to ensure proper electrical contact with the terminals of the components to which the cable 14 is to be attached.

In order to ensure precise stripping so as to obtain relatively precise length of the segment 72 the built in gauging means may be used. The stripped portion of the cable 14 is inserted within the gauging aperture 82 until an abutment edge 92 of the stripped cable abuts against the shoulder 90. The length of the inner conductor receiving section 86 is customized typically at values substantially in the range of ½" so as to provide section 72 having a predetermined length.

In order to install the connector 12 on the distal end of the cable 14, the connector 12 is first releasably mounted on the tool 10 by threadingly engaging the internal sleeve thread 42 of the connector fastening sleeve 36 over the tool fastening sleeve external thread 50. With the connector 12 mounted on the tool fastening sleeve 48 the inner conductor unassembled protruding segment 72 is aligned with the stem channel 32 and the tool 10 is used to push the stem 24 into the distal end of the cable 14 using a pushing and rotating motion as shown by arrows 94 and 96 of FIG. 3.

As the stem 24 penetrates in the cable 14 the tool fastening sleeve channel 52 receives the segment of the inner conductor 16 protruding in the connector fastening sleeves 36 and protruding from the connector fastening sleeves proximal peripheral edge 40. Once the stem is properly inserted within the cable 14 the serration 34 frictionally prevents retraction therefrom while the tool 10 is rotated so as to disengage the tool fastening sleeve external threads 50 from the connector fastening sleeve internal sleeve threads 42.

When not in use, the tool 10 may be stored in a convenient manner by hooking the prehension section 52 to a supporting wall using a conventional hooking structure such as a hook or a nail inserted through the hooking aperture 86.

Figure 7:
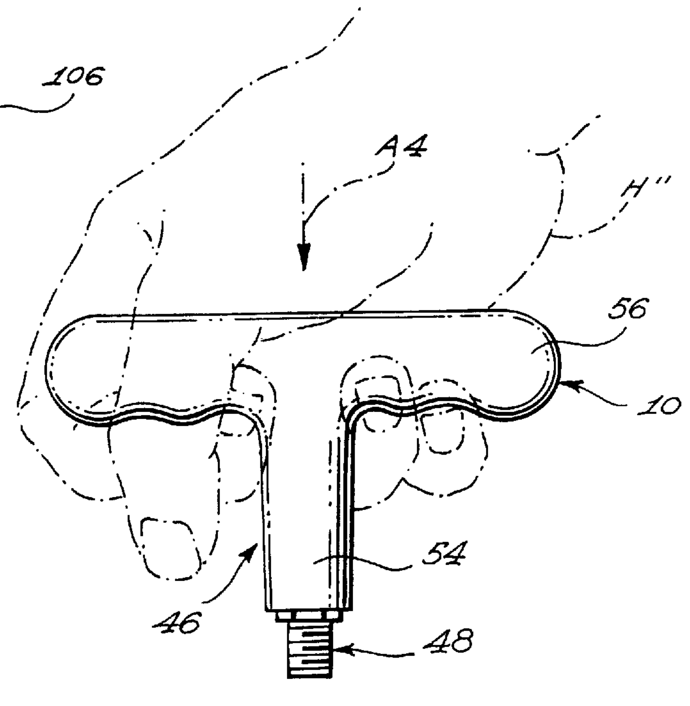
FIG. 7 is a front elevation of the tool of FIG. 1, further showing in phantom lines a hand operatively holding the tool.

The tool 10 according to the present invention thus has important advantages over the prior art tools, such as the above-described Rowe tool. Indeed, as shown in FIG. 7, a hand H" grasping tool 10 will do so by flatly applying the palm of the hand on the upper surface 62 of the tool grasping segment 56, while the fingers will be wrapped around grasping segment 56 by pairs on either side of spacing segment 54. It is then possible to push on tool 10 with one's hand by applying pressure on the palm, along the axis of the forearm, according to arrow A4 in FIG. 7. As described hereinabove, a simultaneous rotating motion is preferably accomplished, to ease the connector onto the cable free end portion, the transversely extending grasping segment 56 significantly helping to provide a greater torque for accomplishing this rotating movement.

It is noted that with the tool 10 of the invention, it is not possible that the hand slide along the tool, since pressure is flatly applied by the hand against the tool. The tool is held in a similar way than a wine bottle corkscrew. This is an efficient way to install the cable connector on the coaxial cable, while Rowe's tool does not allow for this efficiency. With Rowe's prior art tool, as described in the Background of the Invention section and as shown in the annexed FIG. 6, the hand is likely to slide along the handles which are aligned with the intended pressure direction. No perpendicular grasping element is provided in the Rowe tool The important advantages and unexpected results brought about by the present invention, rely on the integral, T-shape of the handle portion 46 of the tool, with the grasping segment being at a permanent right angle relative to the spacing segment. The Rowe patent does not disclose an integral, T-shaped tool, since it is pivotable away from an X-shaped configuration—see the Court interpretation of "integral" in Clipper Belt Lacer Co. v. E-W Co., 237 F. 602 (6$^{th}$ th Ci. 1916). The configuration of the tool of the present invention, on the other hand, allows a firm manual grasp on the tool, while preventing sliding of the tool in the user's hand. The fact that the fingers wrapped around the grasping segment are located on one side and the other of the spacing segment, help to further prevent accidental sliding of the hand on the tool. It is noted that not only is it impossible in the Rowe patent to hold the tool with the transverse handle 104 (FIG. 6 of the present application) because it would pivot under downward pressure being applied thereon, but it is further impossible to hold the handle 104 on one side and the other of the first handle 102 because of the wounds which would result therefrom due to the cutting edges 114, 116 and from the pointed tip 118, as described in the Background of the Invention Section. In addition to this, it is noted that the Rowe pliers cannot be opened fully at a right angle, since their configuration limits the angular spacing of the handles to approximately 75° to 80°. This is of importance, since in the present application the grasping segment which is exactly perpendicular to the spacing segment allows for a uniform axially-aligned pressure to be applied on the tool when the connector is installed on the coaxial cable free end portion.

Any further modifications, which do not deviate from the scope of the present invention, are considered to be included therein.

For example, reference can specifically be made to the priority Provisional Application in which several attachment members were disclosed for attaching a tool similar to tool 10 to the connector sleeve. Thus, although a threaded fastening sleeve portion 48 has been shown on tool 10, there could be provided any suitable attachment member thereon other than a thread, to allow the complementary releasable attachment of a connector sleeve which would not be equipped with a thread, to the tool fastening sleeve.

Such an alternate attachment member can be, for example, a conventional computer coaxial cable attachment bayonet socket, which includes a tool fastening sleeve provided with a pair of radially protruding pins configured to engage a spring-loaded outer slotted sleeve on the cable connector such as in the embodiment of FIG. 9 of the Provisional Application.

Another such attachment member can be provided in the form of the plates shown in FIGS. 12 and 13 of the Provisional Application. In this embodiment, it can be seen that the elongated attachment plate is formed so as to be fixedly attached to the tool at one end, while being provided with a forked end at the other. The forked end is destined to straddle opposite parallel surfaces on the connector sleeve and to retain the connector against the tool fastening sleeve, to prevent same from rotating relative to the tool while the connector sleeve is being forcefully inserted into the coaxial cable free end portion.

In any event, the attachment member must be configured to temporarily removably attach the connector fastening sleeve to the tool fastening sleeve, and thus several complementary tool fastening sleeve and attachment member configurations can be envisioned.

What is claimed is:

1. A tool for mounting a cable connector of a type having a hollow connector stem defining an inner channel and a connector fastening sleeve carried by and coextensive with the connector stem, to a free distal end portion of a coaxial cable having an outer open-ended sleeve member and an inner conductor inside the cable sleeve member, with the inner conductor having a protruding portion axially protruding out of the cable outer sleeve member, said tool comprising:

- an integral, rigid T-shaped handle defining a straight elongated grasping segment and a second straight elongated spacing segment originating and integrally extending perpendicularly from an intermediate portion of said grasping segment and having a free extremity opposite said grasping segment, wherein a perpendicular orientation of said grasping segment relative to said spacing segment of said handle is permanent;
- a tool fastening sleeve fixedly and coextensively attached to said spacing segment free extremity, said tool fastening sleeve having an outer surface sized and configured for complementary engagement with the connector fastening sleeve, said tool fastening sleeve further having an inner channel sized for sliding engagement therein of the protruding portion of the cable inner conductor;
- an attachment member provided on said tool, for releasably fixedly attaching said connector fastening sleeve to said tool fastening sleeve, said attachment member being a thread for threadingly engaging a complementarily thread on the connector fastening sleeve;

the cable connector of a type that can be removably attached to said tool fastening sleeve by engaging the connector sleeve onto said tool fastening sleeve with said attachment member operatively inter-connecting said tool and the connector;

wherein said handle is provided with a stripping blade for stripping a section of the cable sleeve member away from the inner conductor for creating the inner conductor protruding portion, said stripping blade being mounted on said handle.

2. The tool as defined in claim 1, wherein said handle is provided with an aperture in which said stripping blade is mounted so as to extend partially across said aperture.

3. The tool as defined in claim 2, wherein said stripping aperture defines a stripping aperture blade mounting edge and an opposed stripping aperture cable abutment edge, said blade extending from said blade mounting edge in an inclined fashion relative to said cable abutment edge.

4. The tool as defined in claim 3, wherein said cable abutment edge is provided with grooves formed thereon.

5. The tool as defined in claim 1, further comprising a hooking aperture extending transversally through said grasping segment.

6. A tool for mounting a cable connector of a type having a hollow connector stem defining an inner channel and a connector fastening sleeve carried by and coextensive with the connector stem, to a free distal end portion of a coaxial cable having an outer open-ended sleeve member and an inner conductor inside the cable sleeve member, with the inner conductor having a protruding portion axially protruding out of the cable outer sleeve member, said tool comprising:

- an integral, rigid T-shaped handle defining a straight elongated grasping segment and a second straight elongated spacing segment originating and integrally extending perpendicularly from an intermediate portion of said grasping segment and having a free extremity opposite said grasping segment, wherein the perpendicular orientation of said grasping segment relative to said spacing segment of said handle is permanent;

a tool fastening sleeve fixedly and coextensively attached to said spacing segment free extremity, said tool fastening sleeve having an outer surface sized and configured for complementary engagement with the connector fastening sleeve, said tool fastening sleeve further having an inner channel sized for sliding engagement therein of the protruding portion of the cable inner conductor;

an attachment member provided on said tool, for releasably fixedly attaching said connector fastening sleeve to said tool fastening sleeve, said attachment member being a thread for threadingly engaging a complementarily thread on the connector fastening sleeve;

the cable connector of a type that can be removably attached to said tool fastening sleeve by engaging the connector sleeve onto said tool fastening sleeve with said attachment member operatively inter-connecting said tool and the connector; and wherein said handle includes a gauging aperture extending therethrough, said gauging aperture having a complete cable receiving section configured and sized for receiving the cable outer sleeve member and an inner conductor receiving section configured and sized for receiving the inner conductor protruding portion, said complete cable receiving section and said inner conductor receiving section defining an abutment shoulder for an axial abutment thereon of the sleeve member of the cable free end portion thus allowing gauging of a length of the protruding portion of the inner conductor.

7. The tool as defined in claim 6, wherein said grasping segment defines a generally rectilinear palm contacting section and an opposed wavy finger contacting section formed wish grooves sized and shaped to receive a hand's fingers therein.

* * * * *